Patented May 31, 1932                                                     1,860,568

UNITED STATES PATENT OFFICE

FRIEDRICH BORGGRÄFE, OF WEIDENAU-ON-THE-SIEG, GERMANY

PROCESS FOR MANUFACTURING SHEAR-RESISTING IRON SUCH AS IRON FOR DIE-CASTING NUTS, IRON FOR SCREWS, AND THE LIKE

No Drawing. Application filed July 30, 1929, Serial No. 382,280, and in Germany August 29, 1928.

The present invention relates to a process for manufacturing shear-resisting iron, such as iron for die-casting nuts, and iron for screws or the like.

Shear-resisting iron, more particularly iron used for die-casting nuts is a special iron of particular physical properties and of particular composition. It is a so-called coarse-grained or cold short iron with a phosphorous content of 0.2 to 0.5%, which serves as starting material for the manufacture of screw nuts; besides good capability for being worked in the hot (rolling, pressing), the capability of being worked by means of cutting tools (turning, high-speed sawing) without difficulty must be maintained above all; the material on the one hand must neither disintegrate nor tear, on the other hand, the tools used must not be worn excessively. Similar conditions hold for iron, to which an addition of copper or sulphur is advantageously made in order to raise the shearing qualities. On account of its characteristic composition, iron for die-cast nuts is made by a few large foundries only and, in fact, almost exclusively in the Thomas converter according to the basic converting process, basic pig iron being used.

In certain cases iron for die-casting nuts has already been made in the basic Siemens-Martin furnace. The remarks made in the following concerning the method of manufacture in the Thomas converter hold equally well for the manufacture of the product in the basic Siemens-Martin furnace, since the same difficulties appear in both cases.

Hitherto, for manufacturing iron for die-casting nuts, basic pig iron with a composition of about 1 to 1.5% Mn, 1.7–2% P and 0.2–0.5% Si was exclusively used. The basic pig is supplied to the converted liquid, a pig iron mixer being used, for the purpose of desulphurization and, with suitable addition of lime for formation of a slag, is subjected to the blast until recarbonized.

The period of after-blasting follows hereon for the purpose of burning the phosphorus, which goes into the slag as phosphoric acid. The period of after-blasting lasts until it is thought the correct phosphorus content has been attained, and then the refining is interrupted.

According to the strength, the purpose of application and the quality of the nuts or of the shear-resisting iron to be worked up, the phosphorus content in the iron for die-cast nuts may amount to about 0.30 to 0.50%. Catching the charges at the correct instant is often very difficult because the feeding does not always proceed uniformly and correctly, but depends on the temperature and the quality of the pig iron itself, on the temperature of the converter, the blast capacity and the blast pressure and the like. In the present day method of making iron for die-cast nuts or of making shear-resisting iron one is dependent on a very large number of circumstances and contingencies. When it is thought that the correct phosphorus content has been reached the converter is lowered, a preliminary ladle sample taken and the sample hammered out into the form of a plate, it is then broken and the desired phosphorus content judged according to the granular nature of the fracture. In order to arrive at the correct phosphorus content it often happens that the converter must be lowered several times during one and the same charge which is very time-consuming, while in spite of this, the correct phosphorus content is often not attained. In this way spoiled charges and scrap iron are produced.

In order to obtain by blasting an iron for die-casting nuts which to a certain extent is of uniform quality, and in order to keep the phosphorus content within limits which are as narrow as possible, the charges have also been completely blown like charges of liquid iron, and then at the conclusion ferrophosphorus has been added. Considerable difficulties arose here also.

Particularly difficult is the production of iron for press nuts in large converters. In the form of spoilt charges the amount wasted and in consequence the scrap iron formed, is very high, so that in this case the economic production of iron for die-casting nuts is questionable. Good charges of iron for die-cast nuts can only be manufactured with faultless pig iron and faultless feeding. Also the production of the charge material, namely basic pig-iron, is expensive, on account of its high phosphorus content; the latter, however, is absolutely necessary for the carrying out of the process.

In order to remove all these inconveniences and difficulties a process is proposed according to the invention for the manufacture of freely-machining iron, in which a charge, rich in silicon, the phosphorus content of which is adjusted by charging, is decarburized in a furnace with an acidic lining, by blowing. The process may be conducted in many different ways. Thus, a charge containing phosphorus and rich in silicon, preliminarily fused in a cupola furnace, may be subjected to the blast in a small Bessemer converter according to the blasting process, suitable additions of deoxidizing agents being made. The preliminary product, rich in silicon and containing phosphorus, is preferably produced in the cupola furnace by the preliminary fusion of a charge of scrap iron, hæmatite pig-iron, or ferro-silicon with addition of basic pig iron or other additions containing phosphorus such as, e. g. ferrous phosphates, apatite, vivianite, whereby the phosphorus content of the additions rich in phosphorus is adjusted to correspond to that of the end product. The shear-resisting iron prepared in this manner with addition of copper and sulphur is particularly suited for use as iron, since the copper and sulphur content completely removes the danger of tearing or grating.

The essential advance of the new process consists now in the following. Since no loss of phosphorus to be taken into consideration occurs in furnaces with acidic-lined hearths, and therefore in the small Bessemer converter with acidic lining, the addition of pig iron containing phosphorus is to be calculated accurately. The decarburization process is therefore carried out in the simplest manner, in that the charge, as in the production of liquid iron, is decarburized to the usual carbon content. An overblasting of the charge as in the Thomas process is not possible according to the new process for making shear-resisting iron. Moreover, the iron obtains a much more uniform composition and may, with smaller charges, be cast with much less difficulty into small blocks. As is well known, casting into small blocks is particularly advantageous for the formation of texture during rolling. Since, again, the reliable pressing of the nuts depends on the texture formation, according to the new process an iron is produced which fulfills all the preliminary conditions which must be conformed to by iron for die-casting nuts, iron for screws, and by machine stock iron. Spoilt charges and scrap iron production are diminished to a very small minimum, so that the economy of the production is increased.

The costs of a plant for carrying out the process are very low in comparison with those usual hitherto. This process also puts smaller works, more particularly the genuine rolling mills with small Bessemer, in a position to make shear-resisting iron. Since, according to the new process, in the main (to the extent of about 75%) scrap iron is worked up, the costs of preparation of the product are correspondingly low. Only so much expensive basic pig-iron or other additions rich in phosphorus is added as is essential for the end product. Likewise, only so much heat-producing additions (silicon, ferro-silicon, hæmatite pig-iron, etc.) are added as is necessary for the combustion process. The working process is considerably simpler and easier to supervise. The observation of the correct instant of catching the charge, as in the Thomas process, in order to obtain the correct phosphorus, content, does not come into question in the new process. The refining process is effected only down to the removal of carbon, and after addition of the deoxidizing agent the charge is ready. The after-blasting also is dispensed with, since no phosphorus needs to be removed and no diminution in the phosphorus content is effected by the acidic lining of the converter.

In carrying out the new process for regulating a phosphorus content of 0.25%, a cupola type furnace is preferably used. In the same is placed an initial charge rich in silicon and containing phosphorus. To such initial charge when melted is then added material such as apatite and vivianite, thereby adjusting the phosphorus content to an amount equal to the difference between the original phosphorus content and the final content thereof. The melt is thereupon transferred preferably into acid Bessemer whereupon the melt is decarburized by blowing air into the same and finally the decarburized melt is deoxidized by the use of suitable deoxidizing agents.

What I claim is:—

A process for producing shear-resisting iron containing about 0.25% P; which consists in preparing and melting an initial charge in a cupola type furnace; then adding material such as apatite and vivianite containing phosphorus to the molten charge to an amount equal to the difference between the original and final P content; then transferring the melt into an acid Bessemer; then decarburizing the melt by blowing and finally deoxidizing the decarburized melt by the use of deoxidizing agents.

In testimony whereof I have signed my name to this specification.

FRIEDRICH BORGGRÄFE.